: US 11,097,792 B2
(45) Date of Patent: Aug. 24, 2021

(12) United States Patent
Weber et al.

(54) MOUNTING HOLDER FOR A REAR SPOILER OF A MOTOR VEHICLE

(71) Applicant: Dr. Ing. h.c. F. Porsche Aktiengesellschaft, Stuttgart (DE)

(72) Inventors: Sebastian Weber, Esslingen (DE); Riccardo Bauer, Owen (DE); Tobias Posch, Wimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/136,300

(22) Filed: Sep. 20, 2018

(65) Prior Publication Data
US 2019/0106164 A1 Apr. 11, 2019

(30) Foreign Application Priority Data
Oct. 11, 2017 (DE) ...................... 10 2017 123 626.0

(51) Int. Cl.
*B62D 35/00* (2006.01)
*F16B 5/02* (2006.01)
(52) U.S. Cl.
CPC .......... *B62D 35/007* (2013.01); *F16B 5/0208* (2013.01)

(58) Field of Classification Search
CPC .......................... B62D 35/007; F16B 5/0208
USPC .................... 296/180.1, 180.5, 181.5, 76, 29
See application file for complete search history.

(56) References Cited

U.S. PATENT DOCUMENTS

| 4,652,036 | A | * | 3/1987 | Okamoto | B62D 35/007 296/180.1 |
| 6,520,564 | B1 | * | 2/2003 | Liang | B62D 35/007 296/180.5 |
| 6,805,399 | B1 | * | 10/2004 | Brown | B62D 37/02 296/180.1 |
| 9,096,279 | B2 | * | 8/2015 | Beierl | B62D 35/007 |
| 9,186,971 | B1 | * | 11/2015 | Lee | B60J 7/22 |
| 2016/0152287 | A1 | | 6/2016 | Fuchs et al. | |
| 2019/0077469 | A1 | * | 3/2019 | Seon | F01N 13/08 |

FOREIGN PATENT DOCUMENTS

| DE | 102009060868 A1 | 7/2011 |
| DE | 102014017606 A1 | 6/2016 |

* cited by examiner

*Primary Examiner* — D Glenn Dayoan
*Assistant Examiner* — E Turner Hicks
(74) *Attorney, Agent, or Firm* — Leydig, Voit & Mayer, Ltd.

(57) ABSTRACT

A mounting holder for a rear spoiler of a motor vehicle includes a fastening portion for fastening the mounting holder to a body component of the motor vehicle and a holding portion configured to be connected to a lower part of the rear spoiler. The holding portion is of elastic design.

8 Claims, 2 Drawing Sheets

MOUNTING HOLDER FOR A REAR SPOILER OF A MOTOR VEHICLE

CROSS REFERENCE TO RELATED APPLICATIONS

This application claims benefit to German Patent Application No. DE 10 2017 123 626.0, filed Oct. 11, 2017, which is hereby incorporated by reference herein.

FIELD

The invention relates to a mounting holder for a rear spoiler of a motor vehicle.

BACKGROUND

DE 10 2014 017 606 A1 discloses a spoiler device with a basic body, an add-on part which is connectable to the basic body and a guide device with a securing means. The securing means is in the form of a spring element and secures the connection between the basic body and the add-on part.

DE 10 2009 060 868 A1 discloses a connecting arrangement for connecting a rear spoiler of a motor vehicle to a substructure of the motor vehicle, wherein the connecting arrangement has at least one fastening device, and wherein a change in spacing and/or length of the rear spoiler relative to the substructure can be undertaken by loosening or tightening the fastening device.

SUMMARY

In an embodiment, the present invention provides a mounting holder for a rear spoiler of a motor vehicle. The mounting holder includes a fastening portion for fastening the mounting holder to a body component of the motor vehicle and a holding portion configured to be connected to a lower part of the rear spoiler. The holding portion is of elastic design.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide mounting holders which prevent play between a rear spoiler and a body component of a motor vehicle to which the mounting holder is fastened.

Embodiments of the present invention provide mounting holders that comprise a fastening portion for fastening to a body component of a motor vehicle and a holding portion that is connectable to a lower part of a rear spoiler.

The mounting holders are characterized in that the holding portion is of elastic design. In a preferred refinement, the holding portion is of elastic design in a direction of travel of the motor vehicle. The direction of travel of the motor vehicle refers here to the intended fitted position of the mounting holder.

In a preferred refinement, the holding portion is of substantially S-shaped design in a cross section longitudinally to the direction of travel of the motor vehicle.

Preferably, the holding portion comprises a central portion at its end and two side portions which are arranged laterally next to the central portion with regard to the direction of travel.

In a preferred refinement, the central portion and/or the side portions are of substantially U-shaped design in a plane running transversely with respect to the direction of travel.

The mounting holder preferably comprises a bearing portion which is arranged opposite the holding portion in the direction of travel and can be placed onto the body component.

Embodiments of the invention further provide motor vehicles comprising at least one body component, a rear spoiler with a lower part, and a mounting holder, wherein the holding portion of the mounting holder is connected to the lower part of the rear spoiler, and wherein the fastening portion of the mounting holder is fastened to the body component.

Figure 1:
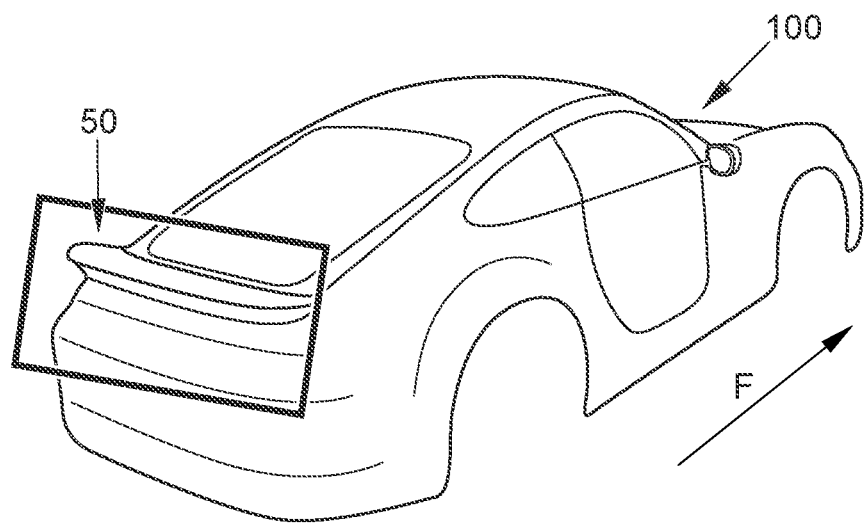
FIG. 1 shows a schematic perspective view of a motor vehicle with a rear spoiler and a mounting holder according to an embodiment of the invention.
Figure 2:
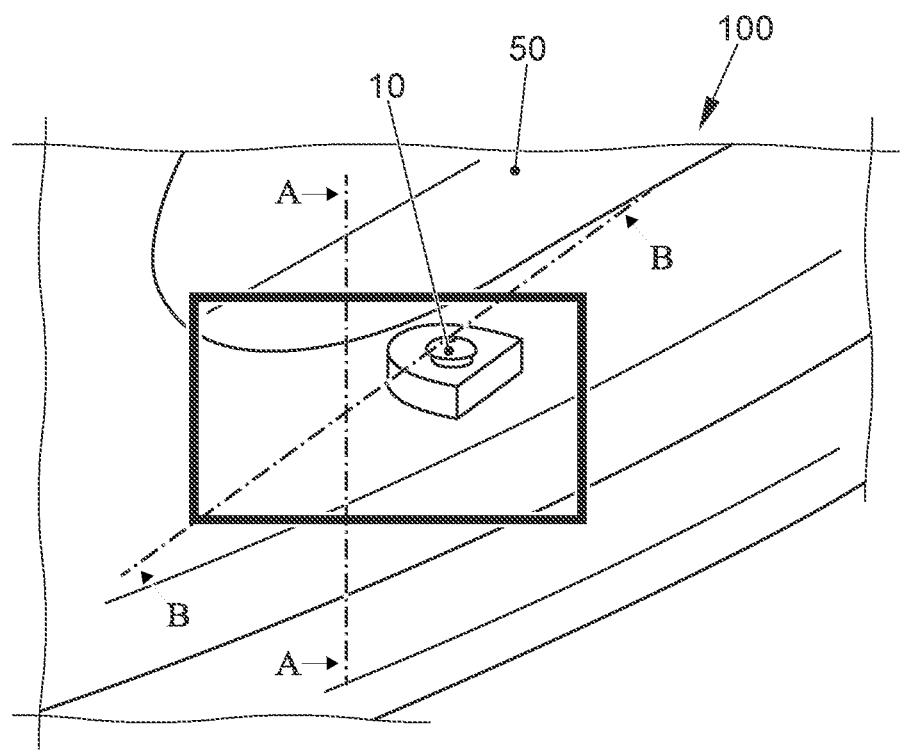
FIG. 2 shows a view of a rear of the motor vehicle of FIG. 1 with the mounting holder according to the embodiment of the invention.
Figure 4:
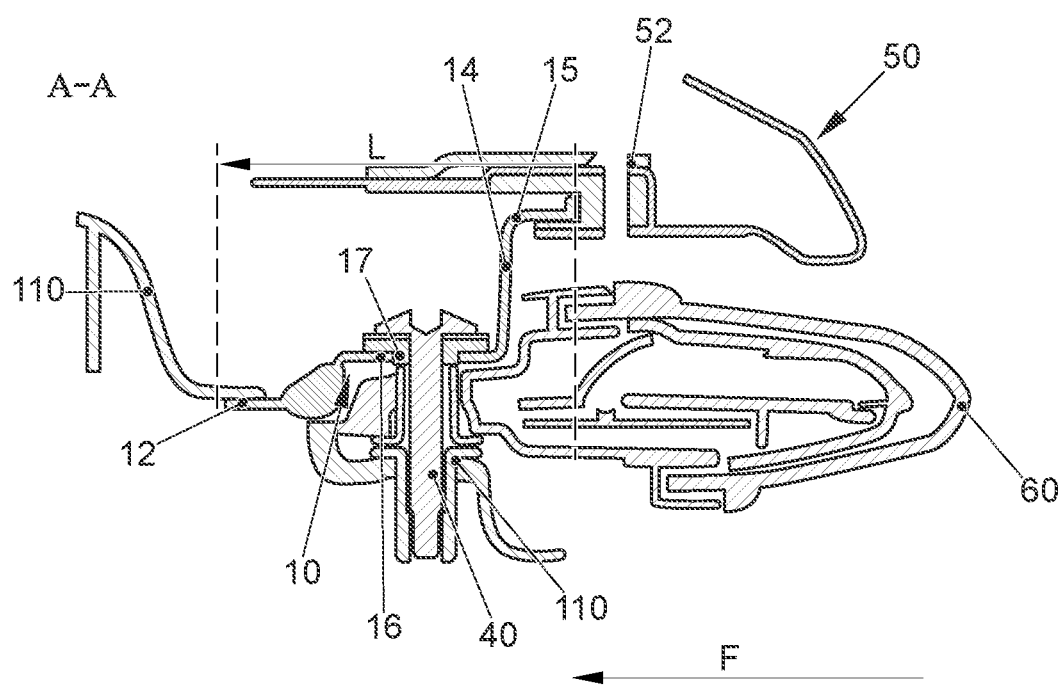
FIG. 4 shows a sectional view according to the intersecting line A-A of FIG. 2.

The mounting holder 10 depicted in FIGS. 2 and 4 serves for the mounting of a rear spoiler 50 depicted in FIG. 1 of a motor vehicle 100 on a body component 110 of the motor vehicle. The mounting holder 10 comprises a fastening portion 16 for fastening the mounting holder 10 to the body component 110, and a holding portion 14 which is connectable to a lower part 52 of the rear spoiler 50. The holding portion 14 is of elastic design.

The holding portion can be of elastic design in particular in a direction of travel F of the motor vehicle 100.

The fastening portion 16 can be provided with a fastening bore 17, and the mounting holder 10 can be fastened to the body component 110 by means of a fastening screw 40 which is guided through the fastening opening 17 and the body component 110. The mounting screw 40 can also serve here for fastening an electric arc 60 of the motor vehicle.

As is revealed in particular in FIG. 4, the holding portion 14 can be of substantially S-shape design in cross section longitudinally to the direction of travel F of the motor vehicle 100.

Figure 3:
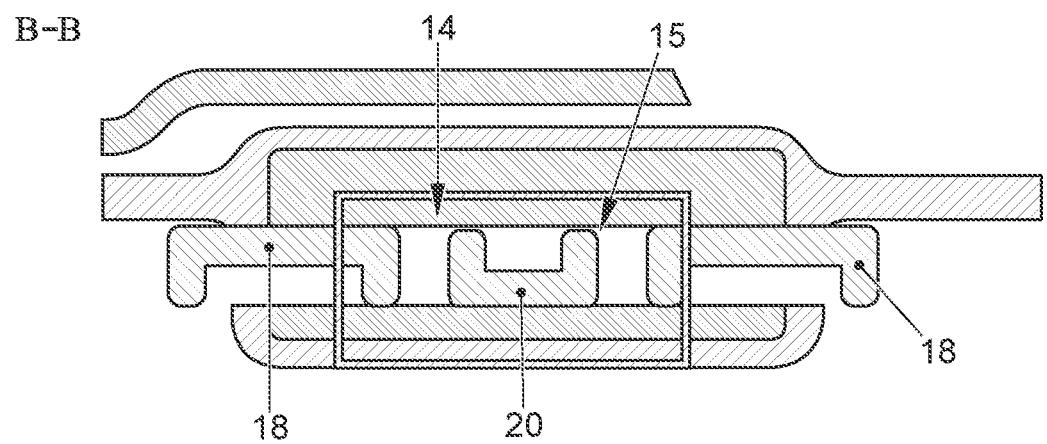
FIG. 3 shows a sectional view according to the intersecting line B-B of FIG. 2.
Figure 3:
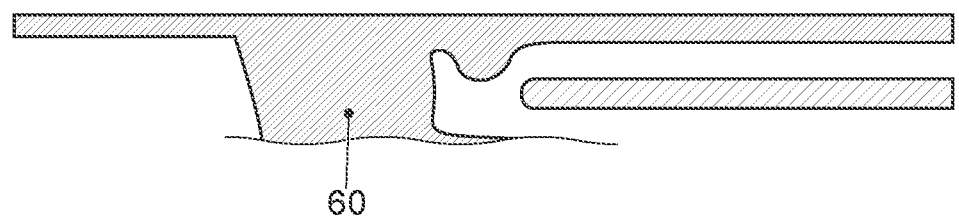

As is revealed in particular in FIG. 3, the holding portion 14 can comprise a central portion 20 at its end 15 and two side portions 18 which are arranged laterally next to the central portion 20 with respect to the direction of travel F. As in particular FIG. 3 furthermore reveals, the central portion 20 and/or the side portions 18 can be of substantially U-shape design here in a plane running transversely with respect to the direction of travel F.

As FIG. 4 reveals, the mounting holder 10 can furthermore comprise a bearing portion 12 which is arranged opposite the holding portion 14 in the direction of travel F and can be placed onto the body component 110.

As is revealed in particular in FIG. 4, the mounting holder 10 according to the exemplary embodiment can serve for extending the support by a length L in the direction of travel F of the lower part 52 of the rear spoiler 50. By means of the geometry of the mounting holder 10 and in particular of the holding portion 14, the support of the lower part 52 can be extended by the length L. The mounting holder 10 and in particular the holding portion 14 can be formed in terms of its geometry as a spring element. Possible play between the body component 110 and the lower part 52 of the rear spoiler 50 can thereby be prevented. By means of the supporting width which is greater by the length L, a more advantageous introduction of force takes place and the gap size can more easily be compensated for. By the mounting holder 10 being configured for preventing possible play, manufacturing tolerances can be better compensated for.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A mounting holder for a rear spoiler of a motor vehicle, the mounting holder comprising:
   a fastening portion for fastening the mounting holder to a body component of the motor vehicle; and
   a holding portion configured to be directly connected to a lower part of the rear spoiler,
   wherein the holding portion is of elastic design, and
   wherein the holding portion is directly connected to the lower part of the rear spoiler by a slot having a U-shaped design in a cross section longitudinally to a normal forward longitudinal direction of travel of the motor vehicle.

2. The mounting holder as claimed in claim 1, wherein the holding portion is of elastic design in a normal forward longitudinal direction of travel of the motor vehicle.

3. The mounting holder as claimed in claim 1, wherein the holding portion is of substantially S-shaped design in a cross section longitudinally to a normal forward longitudinal direction of travel of the motor vehicle.

4. The mounting holder as claimed in claim 2, wherein the holding portion comprises a central portion at its end and two side portions which are arranged laterally next to the central portion with regard to the direction of travel.

5. The mounting holder as claimed in claim 4, wherein the central portion and/or the side portions are of substantially U-shaped design in a plane running transversely with respect to the direction of travel.

6. The mounting holder as claimed in claim 1, further comprising a bearing portion arranged opposite the holding portion in a direction of travel and configured to be placed onto the body component.

7. A motor vehicle comprising:
   a body component;
   a rear spoiler with a lower part; and
   a mounting holder having a holding portion directly connected to the lower part of the rear spoiler and a fastening portion fastened to the body component,
   wherein the holding portion is of elastic design, and
   wherein the holding portion is directly connected to the lower part of the rear spoiler by a slot having a U-shaped design in a cross section longitudinally to a normal forward longitudinal direction of travel of the motor vehicle.

8. The mounting holder as claimed in claim 1, wherein the holding portion is formed as a spring element.

* * * * *